Patented Nov. 10, 1953

2,658,930

UNITED STATES PATENT OFFICE 2,658,930

PRODUCTION OF POLYHALOALKANES

Ralph B. Thompson, Hinsdale, Ill., assignor to Universal Oil Products Company, Chicago, Ill., a corporation of Delaware No Drawing. Application March 22, 1949, Serial No. 82,909

8 Claims. (Cl. 260—658)

1

This invention relates to a process for producing a polyhaloalkane containing at least two carbon atoms per molecule and more particularly to the production of polychloroalkanes and polybromoalkanes.

An object of this invention is to produce a polyhaloalkane having at least two carbon atoms per molecule.

Another object of this invention is to produce a polychloroalkane having at least two carbon atoms per molecule.

A further object of this invention is to produce a polybromoalkane having at least two carbon atoms per molecule.

One specific embodiment of this invention relates to a process for producing a polyhaloalkane which comprises reacting a monoolefinic hydrocarbon and a carbon tetrahalide in the presence of iron, water, and a gas containing uncombined oxygen.

Another embodiment of this invention relates to a process for producing a polychloroalkane which comprises reacting a monoolefinic hydrocarbon and carbon tetrachloride in the presence of iron, water, and a gas containing uncombined oxygen.

A further embodiment of this invention relates to a process for producing a polybromoalkane which comprises reacting a monoolefinic hydrocarbon and carbon tetrabromide in the presence of iron, water, and a gas containing uncombined oxygen.

A still further embodiment of this invention relates to a process for producing a polychloroalkane which comprises reacting a monoolefin and carbon tetrachloride in the presence of iron, water, and air.

I have found that a carbon tetrahalide as carbon tetrabromide and carbon tetrachloride is very stable when stored by itself, but in the presence of iron, water and air it is unstable and becomes colored forming hexachloroethane. It is probable that the hexachloroethane is formed by the union of two trichloromethyl free radicals:

$$2Cl_3C \longrightarrow Cl_3C-C-Cl_3$$ 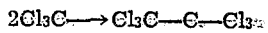

I have found also that an olefinic hydrocarbon and a carbon tetrahalide react in the presence of iron, water and a gas containing free oxygen to form a condensation product of the olefin and carbon tetrahalide according to the equation:

$$CH_3-CH_2-CH_2-CH=CH_2+CCl_4 \longrightarrow$$
$$CH_3-CH_2-CH_2-CHCl-CH_2-CCl_3$$
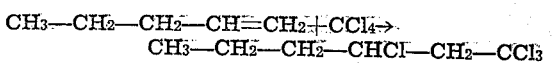

Polyhaloalkanes and particularly polychloro-

2 alkanes formed by this process are useful as intermediates in the production of other organic compounds such as long chain chlorine-containing aliphatic carboxylic acids which may be formed by hydrolysis of long chain tetrachloroalkanes having three carbon atoms bound to a terminal carbon atom of said aliphatic chain. Thus the

group is hydrolyzable to a —COOH group.

Olefinic hydrocarbons which are also used as starting materials in this process include both normally gaseous and normally liquid monoolefinic hydrocarbons, such as ethylene, propylene, butylenes, pentenes, and normally liquid monoolefins of higher molecular weights than pentenes.

It is sometimes preferred to employ the normally liquid monoolefins as reactants in this condensation process which is preferably carried out in liquid phase.

The carbon tetrahalides which are condensed with olefinic hydrocarbons as herein set forth, comprise carbon tetrachloride and carbon tetrabromide as well as carbon tetrahalides in which the carbon atom is bound to both chlorine and bromine atoms.

In carrying out this process, a monoolefinic hydrocarbon and a carbon tetrahalide in which the carbon atom is chemically combined with at least one member of the group consisting of chlorine and bromine are charged to a suitable reactor, such as a steel autoclave into which iron, water, and a gas containing uncombined oxygen are also introduced. The charged autoclave or other reactor containing the mentioned reaction mixture is then rotated or agitated otherwise to effect intimate contact of the components of the reaction mixture, while it is maintained at a temperature of from about 0° to about 100° C. for a time sufficient to effect reaction of a substantial proportion of the olefinic hydrocarbon and carbon tetrahalide. Part of the carbon tetrahalide reacts with the olefinic hydrocarbon to form a tetrahaloalkane of higher molecular weight than said carbon tetrahalide, while a portion of the carbon tetrahalide undergoes a condensation reaction by which two halogen atoms are removed from two molecular proportions of the carbon tetrahalide and hexahaloethane is formed presumably by the union of two trihalomethyl free radicals as indicated by the foregoing equation.

The process may also be carried out in the absence of an olefinic hydrocarbon, in which case the carbon tetrahalide reacts to form a hexahaloethane. Thus carbon tetrachloride and carbon tetrabromide yield hexachloroethane and hexabromoethane.

This process is carried out in the presence of air, oxygen, or a mixture of oxygen and a substantially inert gas. The iron which is employed as one of the components of the reaction mixture may be in the form of rods, strips, thin sheets, turnings, filings, etc., but in general it is more active in the more finely divided condition, particularly as filings and turnings.

The process may be carried out by using either batch or continuous types of treatment. In a batch-type operation, the olefinic hydrocarbon and carbon tetrahalide may be commingled and placed in a reactor constructed from glass, porcelain, steel or copper and the like, to which iron, in the form of strips, turnings, etc., water and a gas containing free oxygen are also introduced and kept therein while the reaction mixture is maintained at a temperature of from about 0° C. to about 100° C. The reactor used in the process is also preferably provided with a suitable mixing device for effecting intimate contact of the reacting olefinic hydrocarbons and carbon tetrahalide with the iron, water, and oxygen containing gas, also present in the reaction system.

This process for producing polyhaloalkanes may also be carried out in a continuous manner by passing the monoolefinic hydrocarbon, carbon tetrahalide, steam or water vapor and a gas containing free oxygen through a suitable reactor containing iron packing material and maintained at a temperature preferably above 10° C. and at generally from about 25° to about 75° C.

The reaction mixture obtained from either the batch or continuous types of operation is then subjected to suitable separating treatment to recover the desired tetrahaloalkane and small amounts of hexahaloethane and to separate and return to the process the unconverted carbon tetrahalide and monoolefinic hydrocarbon that may be present in the reaction products. Unconverted reactants so recovered from the process may then be returned to further treatment in the presence of the iron, water, and oxygen containing gas, such as air, which was charged to the process.

The following examples illustrate the results obtained in the operation of this process but the data given should not be construed to limit unduly the generally broad scope of the invention.

Example I

Carbon tetrachloride (500 g.), octene-1 (56 g.) six iron strips (1 x 12 x 150 mm.) and water (20 cc.) were stored at 38° C. in a 500 cc. bottle vented to the air through a capillary. After 22 days the water and iron were separated and the organic material distilled. After removing excess carbon tetrachloride and octene at atmospheric pressure, the distillation was completed at a pressure of 17 mm. of mercury giving about 10 g. of product boiling at 137–140° C./17 mm. having $n_D^{20}=1.4766$. The reaction between carbon tetrachloride and octene-1 was repeated giving a yield of about 18–20% of the tetrachlorononane based upon the octene-1 used.

Example II

A run similar to that referred to in Example I but without an olefin was carried out at 38° C. during a time of 30 days. The organic material was then separated from the iron and water and the organic material was distilled to remove carbon tetrachloride leaving a residue of about 5% of hexachloroethane which yielded white crystals melting at 186° C.

I claim as my invention:

1. A process which comprises reacting a monoolefinic hydrocarbon and a carbon tetrahalide in the presence of finely divided iron, water, and a gas-containing uncombined oxygen at a temperature from about 0° to about 100° C. to form a polyhaloalkane of higher molecular weight than said carbon tetrahalide.

2. A process which comprises reacting a monoolefinic hydrocarbon and carbon tetrachloride in the presence of finely divided iron, water, and a gas containing uncombined oxygen at a temperature from about 0° to about 100° C. to form a polychloroalkane of higher molecular weight than said carbon tetrachloride.

3. A process which comprises reacting a monoolefinic hydrocarbon and a carbon tetrahalide in the presence of finely divided iron, water and air at a temperature of from about 0° to about 100° C. to form a polyhaloalkane of higher molecular weight than said carbon tetrahalide.

4. A process which comprises reacting a monoolefinic hydrocarbon and carbon tetrachloride in the presence of finely divided iron, water, and air at a temperature of from about 0° to about 100° C. to form a polychloroalkane of higher molecular weight than said carbon tetrachloride.

5. A process which comprises reacting a monoolefinic hydrocarbon and carbon tetrabromide in the presence of finely divided iron, water, and air at a temperature of from about 0° to about 100° C. to form a polybromoalkane of higher molecular weight than said carbon tetrabromide.

6. A process which comprises reacting a normally gaseous monoolefin and carbon tetrachloride in the presence of finely divided iron, water, and air at a temperature of from about 0° to about 100° C. to form a polychloroalkane of higher molecular weight than said carbon tetrachloride.

7. A process which comprises reacting a normally liquid monoolefin and carbon tetrachloride in the presence of finely divided iron, water, and air at a temperature of from about 0° to about 100° C. to form a polychloroalkane of higher molecular weight than said carbon tetrachloride.

8. A process which comprises reacting octene-1 and carbon tetrachloride in the presence of finely divided iron, water, and air at a temperature of from about 0° to about 100° C. to form a tetrachlorononane.

RALPH B. THOMPSON.

References Cited in the file of this patent

UNITED STATES PATENTS

| Number | Name | Date |
| --- | --- | --- |
| 1,097,145 | Snelling | May 19, 1914 |
| 2,002,168 | Bralliet | May 21, 1935 |
| 2,104,703 | Coleman et al. | Jan. 4, 1938 |
| 2,440,800 | Hanford et al. | May 4, 1948 |
| 2,468,208 | Kharasch | Apr. 26, 1949 |
| 2,519,691 | Neuworth | Aug. 22, 1950 |